March 15, 1949.  N. T. HURD  2,464,315
SWIVEL DRAFT BAR FOR TRACTORS AND THE LIKE
Filed Aug. 29, 1947

Inventor
NORRIS T. HURD
By Francis J. Klempay
Attorney

Patented Mar. 15, 1949

2,464,315

UNITED STATES PATENT OFFICE 2,464,315

SWIVEL DRAFT BAR FOR TRACTORS AND THE LIKE

Norris T. Hurd, Youngstown, Ohio

Application August 29, 1947, Serial No. 771,254

5 Claims. (Cl. 280—33.44)

This invention relates to improvements in draft bar structures for separably connecting the trailing vehicle or working implement to a powered vehicle as a tractor, for example. More particularly, the invention relates to an improved hitch for separably interconnecting a two-wheeled traction vehicle and an implement or trailing vehicle to be drawn thereby. A primary object of the invention is the provision of an improved hitch of this nature and for use with a two-wheeled tractor which is operative when applied to an implement or trailer to provide an adequately articulated interconnection while yet enabling the tractor to be supported in such manner that it is free-standing. Thus, assuming that a two-wheeled garden tractor is to be attached to a trailing lawn roller, for example, the hitch of the invention will prevent the tilting of the tractor about the axis of its wheels or the tilting of any seat supporting or other frame on the roller about the axis of the roller while yet providing a hitch of a rugged and durable nature and capable of allowing unlimited relative side tilting between the tractor and roller and independent turning of the tractor whereby the assembly may be adequately guided. These same considerations are true as regards the application of the hitch of this invention to any trailing implement or single axle wheeled vehicle.

A further and more specific object of the invention is the provision of an improved trailer hitch of the horizontal swivelling type wherein improved provision is made for lubricating the swivelling interconnection including the thrust bearing which draws the load.

Another object of the invention is the provision of an improved hitch for small tractors and the like which is simple in design but rugged in character and which is provided with an attaching part which may be rigidly bolted or otherwise rigidly connected to a principal casing of the traction vehicle.

The above and other objects and advantages of the invention will become apparent upon consideration of the following detailed specification and the accompanying drawing wherein there is disclosed a preferred embodiment of the invention.

Figure 1:
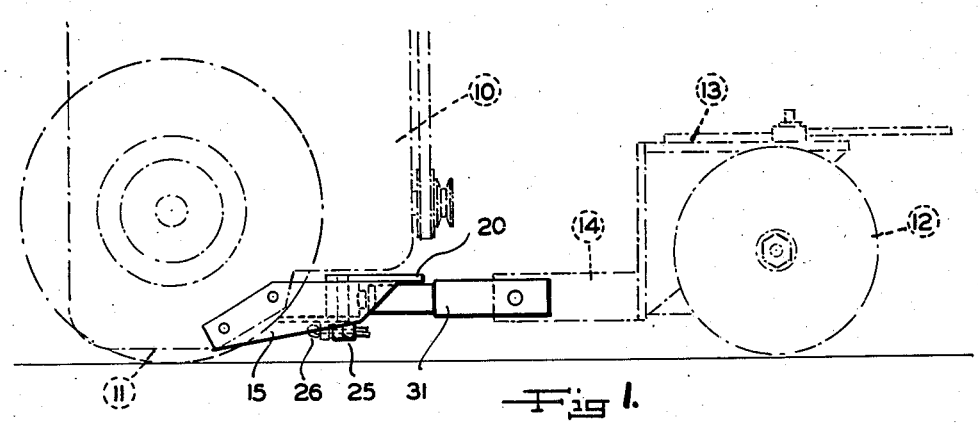
Figure 1 is a side elevation of a trailer hitch constructed in accordance with the principles of my invention, the view showing the hitch in assembled relation with a traction vehicle and a trailing vehicle.
Figure 2:
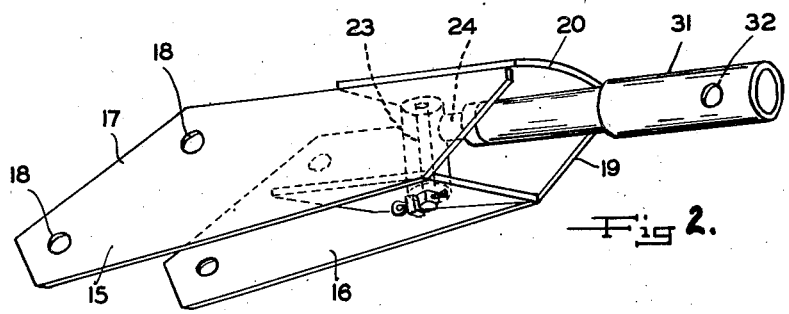
Figure 2 is a perspective view of a trailer hitch of Figure 1.
Figure 3:
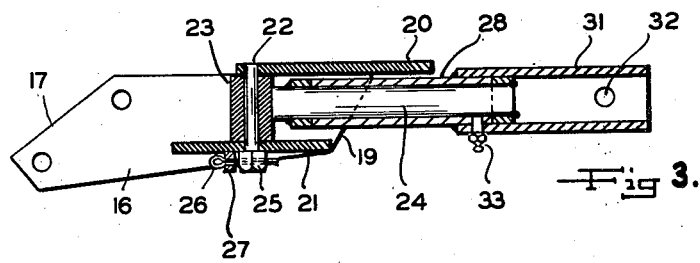
Figure 3 is a longitudinal section through the trailer hitch of Figure 1.
Figure 4:
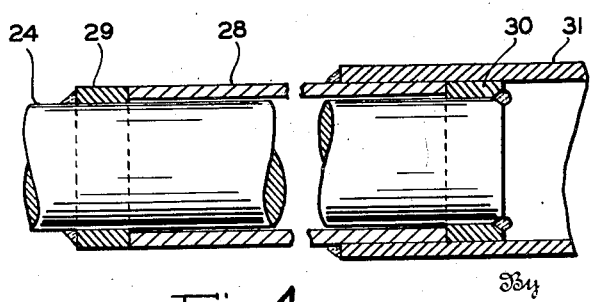
Figure 4 is a fragmentary section, on an enlarged scale through a portion of the apparatus of Figure 1.

Referring now to the drawing in detail there is shown in dotted outline at 10 the principal casing of a small tractor having two traction wheels one of which is shown in dotted outline at 11. Also shown on Figure 1 is a drawn soil-tilling disc having rotary blades 12 and a frame 14 to which is rigidly attached in forwardly projecting relation a hitching tube 14.

In the illustrated application of the invention the hitch may conveniently be attached directly to the principal or gear case 10 by means of bolts or studs already provided on opposite sides of the casing 10 and therefore I may construct one of the parts of my improved hitch of a pair of spaced parallel side plates 15 and 16 each of which is provided with an inclined end edge 17 along which is spaced a pair of apertures 18 for receiving the attaching cap screws, not shown, which have screw threaded engagement with threaded bores formed in the casing 10. The opposite end edges of the plates 15 and 16 are also inclined as shown at 19 and spanning the upper edges of the plates 15 and 16 above the edges 19 is a horizontally disposed plate 20 which is welded or otherwise rigidly secured to the plates 15 and 16. To complete the box-like structure of the tractor mounting part of the hitch a second plate 21, having parallel offset relation to the plate 20, is welded or otherwise rigidly secured inbetween the two parallel side plates 15 and 16.

Plates 20 and 21 are provided with aligned apertures to receive a headed pivot pin 22 which is inserted from below and swivably mounted on the pivot pin 22 is a sleeve 23 to which is rigidly connected, preferably by welding, a radially outward extending shaft 24. The enlarged head 25 of the pivot pin 22 is formed with a transverse aperture to receive a cotter pin 26 which also passes through an aperture formed in a lug 27 which is welded to the bottom surface of plate 21 at a point adjacent the location of the head 25. In this manner the pin 22 is prevented from dropping out of its socket and the upper end of the pin 22 is left flush with the upper surface of the plate 20. Rotatably mounted on the shaft 24 is a sleeve 28 which is restrained against axially inward sliding movement by a collar 29 which is welded onto the shaft 24 and which is restrained against axially outward sliding movement by the collar 30 which is welded to the outer end of the shaft 24. Welded to the outer surface of the sleeve 28 is a coupling tube 31 which extends outwardly beyond the end of the shaft 24 in rotatable relation to the collar 30 and which has, in its projecting rear end portion, a diametrically extending aperture 32 to slideably receive a coupling pin, not shown, which also passes through a diametrically extending bore formed in the hitch tube 14 of the drawn implement. It will be understood that the internal diameter of the hitch tube 14 of each of the implements to be associated with the hitch of the invention will be of slightly larger diameter than the external diameter of the tube 31 so that the tube 31 may be readily slideably received or inserted in the tube 14.

Since during normal operation of the hitch the sleeve 28 will have considerable turning movement on the shaft 24 and since considerable end thrust will occur between the ends of the sleeve 28 and the collars 29 and 30 it is desirable to effectively lubricate the various bearing surfaces involved and I conveniently accomplish this by drilling and tapping overlapped sections of the sleeve 28 and tube 31 to receive a lubricant conducting fitting 33 of a pressure lubricating system. It will be understood that upon the application of a grease pressure conducting tube or implement to the fitting 33 the space between the shaft 24 and the sleeve 28 and the spaces between the ends of the sleeve 28 and the collars 29 and 30 will be pressure filled with lubricant.

It should now be apparent that I have provided an improved swivel draft bar for tractors and the like which accomplishes the objects initially set out. Most important is the ability of the draft bar of my invention to effectively couple, in an articulating manner, a single-axle traction device as a two-wheeled garden tractor for example with a working implement or a simple single-axle trailing vehicle to provide a unitary assembly which is free-standing and in which the operator may ride on the drawn implement or trailing vehicle. There is thus avoided any necessity for employing castor wheels on the traction vehicle or on the drawn implement or carrier. Further, the hitch enables independent tilting movement of the tractor and drawn units of the assembly in a transverse direction while allowing adequate pivoting of the tractor about a vertical axis relative to the drawn unit whereby the complete assembly may be readily steered.

It should be observed that due to the tubular nature of the coupling member 31 the drawn implement or vehicle may be provided either with a forwardly extending coupling member which is in the form of a tube for reception over the member 31 as suggested in Figure 1 or for telescoping reception in the member 31 or, alternatively, such coupling member may be simply in the form of a solid shaft. Inasmuch as the coupling tube 31 is free to turn the interconnection provided by the coupling pin, not shown, received in aperture 32 need not be capable of transmitting appreciable torque but has its requirement more or less limited to the transmission of the pulling force.

It should also be observed that the overhanging nature of the plate 20 will prevent undue deflection in the draft bar in the event of severe shock loads since its proximity to the sleeve 28 prevents excessive upward movement of the center part of the sleeve 28 relative to other parts of the assembly.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. In a trailer hitch a pair of spaced parallel side plates adapted to be rigidly secured to opposite side surfaces of a traction vehicle and to project rearwardly therefrom, a pair of vertically spaced but horizontally extending plates interconnecting the rear end portions of said side plates to provide a box-like structure open at its rear end, a vertically disposed pivot pin spanning said horizontally extending plates, a sleeve rotatably mounted on said pin, a shaft rigidly secured to said sleeve and projecting radially outward thereof in a rearward direction, a coupling tube received over a portion of said shaft and rotatable thereon, and means on shaft abutting means in said tube to restrain axial movement of said tube relative to said shaft.

2. Structure according to claim 1 further characterized in that said means to restrain comprises a sleeve secured within said tube and a pair of axially spaced collars secured to said shaft and engaging the opposite ends of the last mentioned sleeve.

3. Structure according to claim 1 further characterized in that said pivot pin is provided with an integral enlarged head having a diametrically extending aperture therethrough, an apertured lug secured to and depending from the bottom surface of the lowermost of said horizontally disposed plates at a point adjacent the axis of said pivot pin, and a removable elongated connector passing through the aperture in said lug and the aperture in said head to restrain outward movement of said pivot pin.

4. A swivel draft bar for drawing a device having an elongated and forwardly extending coupling member rigidly attached to the frame thereof comprising a box-like bracket adapted to be rigidly attached to the traction vehicle, said bracket having a pair of vertically spaced but generally horizontally disposed walls, a vertically disposed pivot pin spanning said walls, a rearwardly extending shaft pivoted on said pin, a coupling tube swivelled on said shaft and adapted to have detachable telescopic interconnection with said coupling member, means to restrain axial movement of said tube with respect to said shaft, and an integral rearwardly disposed extension on said upper wall to engage said tube at a point spaced a substantial distance rearwardly of said pivot pin upon an excessive downward thrust being applied to the draft bar assembly whereby the application to said pin of excessive bending moments is avoided.

5. A swivel draft bar for drawing a device having a forwardly extending coupling member rigidly attached to the frame thereof comprising a bracket adapted to be rigidly attached to the traction vehicle, a vertically disposed pivot pin carried by said bracket, a rearwardly extending shaft pivoted on said pin, a coupling tube swiveled on said shaft and adapted to have detachable interconnection with said coupling member, means to restrain axial movement of said tube with respect to said shaft whereby a pulling force applied to said bracket and shaft is transmitted to said coupling member, and a rigid horizontally disposed but rearwardly extending plate-like extension on said bracket positioned in close overlying relation to said shaft at points spaced a substantial distance rearwardly of said pivot pin so that upon an excessive downward thrust being applied to the draft bar assembly the application to said pin of excessive bending moments is avoided.

NORRIS T. HURD.

REFERENCES CITED

The following references are of record in the file of this patent:

UNITED STATES PATENTS

| Number | Name | Date |
|---|---|---|
| 1,416,171 | Cole | May 16, 1922 |
| 1,590,582 | Johnson et al. | June 29, 1926 |
| 1,895,992 | Hepburn | Jan. 31, 1933 |
| 2,133,065 | Weber | Oct. 11, 1938 |
| 2,383,666 | Martin | Aug. 28, 1945 |
| 2,404,362 | Carlson | July 23, 1946 |